United States Patent [19]

Reimert et al.

[11] Patent Number: 4,753,565

[45] Date of Patent: Jun. 28, 1988

[54] METHOD OF AND APPARATUS FOR DISCHARGING SOLIDS FROM A PRESSURIZED CONTAINER

[75] Inventors: Rainer Reimert, Idstein; Heinz Wolf, Bad Nauheim, both of Fed. Rep. of Germany

[73] Assignee: Metallgesellschaft Aktiengesellschaft, Frankfurt am Main, Fed. Rep. of Germany

[21] Appl. No.: 882,277

[22] Filed: Jul. 7, 1986

[30] Foreign Application Priority Data

Jul. 27, 1985 [DE] Fed. Rep. of Germany ....... 3526968

[51] Int. Cl.$^4$ .............................................. C10J 3/00
[52] U.S. Cl. ...................................... 414/221; 406/124
[58] Field of Search .............. 414/217, 221, 288, 290, 414/292, 298, 786; 406/124, 125, 126, 146; 422/219, 232

[56] References Cited

U.S. PATENT DOCUMENTS

| | | | |
|---|---|---|---|
| 2,151,514 | 3/1939 | Heinen | 414/221 |
| 2,667,280 | 1/1954 | Lane et al. | 414/217 X |
| 3,001,652 | 9/1961 | Schroeder et al. | 414/217 |
| 3,259,470 | 7/1966 | Hofmann et al. | 422/232 X |
| 4,047,644 | 9/1977 | Raymond | 406/124 |
| 4,273,156 | 6/1981 | Borodin | 422/219 X |
| 4,398,852 | 8/1983 | Milligan | 406/124 X |
| 4,400,125 | 8/1983 | Jensen | 414/221 X |

OTHER PUBLICATIONS

Pressurized-Lock Hoppers-Table V, Chemical Engineering, Dec. 1974, pp. 113-116.

Primary Examiner—Peter A. Aschenbrenner
Attorney, Agent, or Firm—Karl F. Ross; Herbert Dubno

[57] ABSTRACT

The container communicates through an outlet, which is adapted to be closed with a lock chamber, which is adapted to be emptied and is provided with a pressure-relief valve. When it is desired to empty the lock chamber the volume which is available in the lock chamber for the gas is initially increased so that the pressure in the lock chamber is reduced. Thereafter the lock chamber is opened.

4 Claims, 2 Drawing Sheets

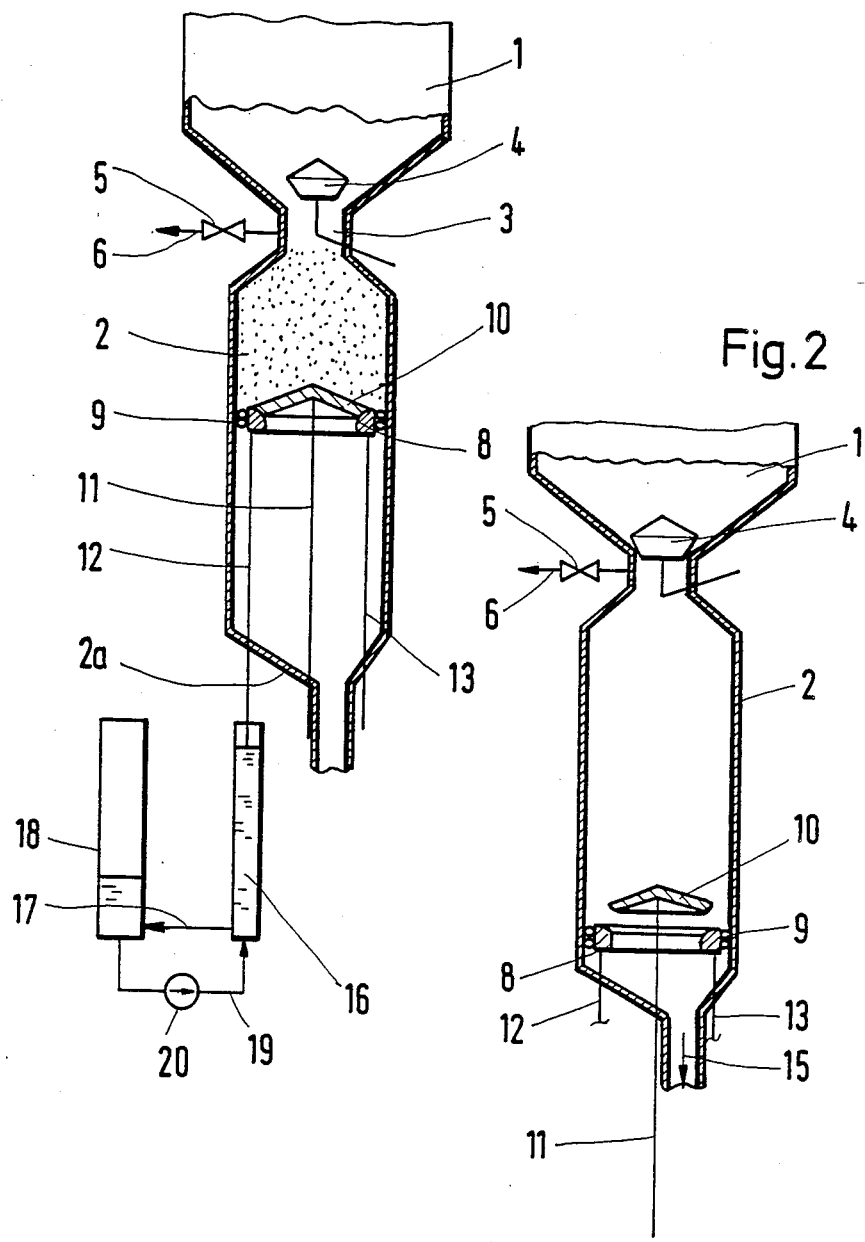

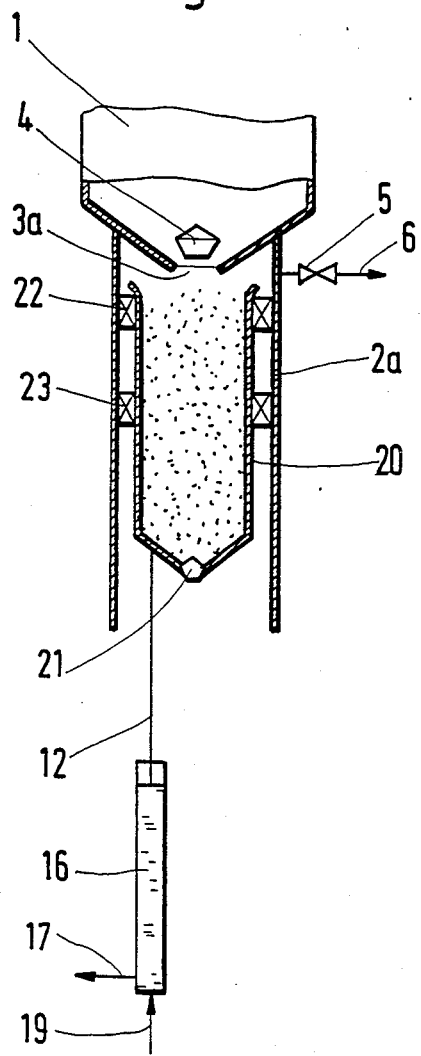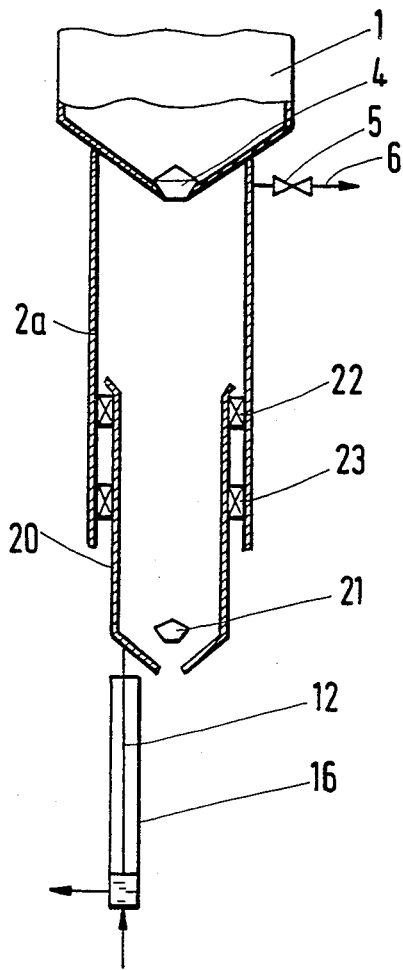

4,753,565

METHOD OF AND APPARATUS FOR DISCHARGING SOLIDS FROM A PRESSURIZED CONTAINER

FIELD OF THE INVENTION

Our present invention relates to a method of removing pulverulent or granular solids, hereinafter also referred to as flowable solids, from a pressurized container, which communicates through an outlet, which is adapted to be closed, with a lock chamber, which is adapted to be emptied. The invention also relates to an apparatus for carrying out this method and, specifically, to a unique lock for such use.

BACKGROUND OF THE INVENTION

When fine-grained or pulverulent bulk materials are removed from pressurized containers, the gas which escapes from the lock chamber as the latter is pressure-relieved will entrain fine material.

That undesired discharge of the solids can be prevented by filling the lock chamber only in part so that a stilling or quieting space is disposed above the bulk material and solids entrained from the bulk material, in response to a pressure relief, can be collected in this stilling space.

Alternatively, the lock chamber may be very gradually relieved of pressure so that gas will flow only at a low velocity in the chamber.

OBJECTS OF THE INVENTION

It is an object of the invention to ensure that even when the lock chamber is completely filled, the gas flowing out of the lock chamber in response to a pressure relief of the chamber, will not entrain solids in undesired quantities.

Another object is to provide an improved method of removing flowable solids from a pressurized container which obviated prior art drawbacks.

Still another object of our invention is to provide an apparatus, especially an improved lock, for carrying out the method.

SUMMARY OF THE INVENTION

These objects are achieved in accordance with the invention, in that the volume which is available in the lock chamber for the gas is increased after the solids have been transferred into the lock chamber and the outlet of the container has been closed, so that the pressure in the lock chamber is reduced by the increase of this volume. From a technical aspect, there is no limit to the increase of the volume so that the pressure in the lock chamber can be reduced as desired and the reduced pressure may amount to only about 1 bar, if desired.

In an embodiment of the process, the volume which is available for the gas in the lock chamber is increased so that the remaining pressure in the lock chamber exceeds atmospheric pressure, and this remaining pressure from the lock chamber is relieved through a pressure relief valve.

Because the pressure relief valve is not relied upon to relieve the lock chamber from the initial super-atmospheric pressure and a smaller quantity of gas flows from the bulk material through the valve, the velocity at which the gas flows from the bulk material may be as low as is desired.

Owing to the previous increase of the volume of the lock chamber, a stilling space is also available, even if the chamber was originally full, so that any solids which are entrained by the gas flowing in response to the pressure relief will settle and be collected in the lock chamber.

The lock chamber provided in accordance with the invention for discharge of pulverulent or granular solids from a pressurized container, which communicates with the lock chamber through an outlet to be closed, has a displaceable chamber wall, which is guided in a sealed manner. The bottom of the lock chamber is usually displaceable. The bottom of the lock chamber can have an outlet which is provided with a displaceable cover and through which the solids leave the lock chamber after the pressure relief.

In an embodiment of the lock chamber, the displaceable wall or displaceable bottom may be coupled to means for a recovery of energy. In that case, the displacement for relieving the lock chamber from pressure is used for a storage of energy outside the lock and said energy is then available for compressing the gases in the lock chamber. That recovery of energy may be effected by mechanical or hydraulic means.

BRIEF DESCRIPTION OF THE DRAWING

The above and other objects, features and advantages of the present invention will become more readily apparent from the following description, reference being made to the accompanying highly diagrammatic drawing in which:

FIG. 1 is a vertical section through a first embodiment of the lock chamber in a filled state;

FIG. 2 is a similar view which shows the lock chamber of FIG. 1 in an empty state;

FIG. 3 is a vertical section through a second embodiment of the lock chamber in a filled state; and FIG. 4 shows the lock chamber of FIG. 3 when it has been emptied.

SPECIFIC DESCRIPTION

A lock chamber 2 is disposed under the pressurized container 1 shown in FIGS. 1 and 2 and communicates with the container 1 through the outlet 3.

The container 1 may consist, e.g. of a reactor which is always pressurized to a superatmospheric pressure.

When the pulverulent or granular solids contained in the container 1 are to be removed from the latter, the valve 4 associated with the outlet 3 is opened, as shown in FIG. 1, so that the solids can flow through the outlet 3 into the lock chamber 2. At that time, the pressure-relief valve which is disposed at the top end of the lock chamber and incorporated in line 6 is closed.

The lock chamber 2 comprises a displaceable bottom, which consists of an annular member 8, that is provided with seals 9, and of a displaceable cover 10, which rests on the annular member 8. A push rod 11 is connected to the cover. A plurality of guide rods 12, 13 are secured to the annular member 8 and are slidably guided in the funnel-shaped wall portion 2a of the lock chamber 2. The wall portion 2a is also provided with such a sliding guide for the push rod 11.

When the lock chamber 2 has been filled with solids from the container (FIG. 1), the valve 4 is actuated to close the outlet 3. At that time, the superatmospheric pressure in the lock chamber 2 is the same as the pressure in the container 1.

Thereafter, the annular member 8 and the cover 10 are moved downwardly so that the volume for the lock chamber 2 is increased. As a result, the pressure in the lock chamber 2 is reduced in dependence on the volume ratio.

When the annular member 8 has reached its lower end position, the remaining pressure in the enlarged lock chamber may lie between 0 and about 1 bar above the atmospheric pressure.

Now the cover 10 may be opened (FIG. 2) to effect a slight residual pressure relief through the bottom of the lock chamber. The solids flow downwardly out of the lock chamber through the annular member 8 past the opened cover 10, as is indicated by the arrow 15, whereas the pressure relief valve 5 may be kept closed.

If the residual superatmospheric pressure in the lock chamber is still considerable when the bottom has been moved down, it is recommended to first open the valve 5 so that the pressure will be relieved to 1 bar. In an alternative mode, that pressure relief may be effected as the bottom is lowered.

FIG. 1 diagrammatically shows how the energy which is released during the movement of the lock chamber consisting of the annular member 8, the seals 9 and 10 can be stored and can be recovered, at least in part. For that purpose, the guide rod 12 cooperates with a hydraulic cylinder 16, so that the descent of the annular member 8 causes liquid to be forced out of the cylinder 16 through line 17 into the pressure accumulator 18 so that the pressure in the latter is increased.

When it is desired to raise the annular member 8 toward the outlet 3, the pressure in the pressure accumulator 18 is applied to the hydraulic cylinder 16 through line 19, which incorporates a pump 20. The recovery of energy is illustrated in a highly simplified manner. It will be understood that in practice all guide rods 12, 13 will be coupled to hydraulic cylinders 16. For the sake of clarity, a plurality of such cylinders have not been shown on the drawing.

The lock chamber 2a, shown in FIGS. 3 and 4 comprises an inner container 20, which is movable up and down and provided with a bottom valve 21, through which the solids flow out after the pressure relief (FIG. 4).

In the position in which the lock chamber is to be filled, see FIG. 3, the inner container is disposed closely below the outlet 3a through which the solids flow down when the valve 4 is open. Seals 22 and 23 are provided between the inner container 20 and the inside surface of the lock chamber. Because the inside surface 2a is not contacted by solids in the range of movement of the seals, the latter will be kept intact during operation. The means for recovering part of the kinetic energy of the inner container 20 may be designed as shown in FIGS. 1 and 2 and are shown only in part in FIGS. 3 and 4. The explanations furnished with reference to FIGS. 1 and 2 are analogously applicable.

We claim:

1. A lock for the discharge of flowable solids from a pressurized container, comprising:

enclosure means forming a lock chamber below said container;

means forming a closable passage at a lower portion of said container communicating with an upper part of said lock chamber;

a displaceable bottom guided sealingly in said enclosure means and defining said lock chamber therein, the volume of said lock chamber being determined by the position of said displaceable bottom; and means for controlling the displacement of said bottom to relieve pressure in said lock chamber upon transfer of a portion of said solids thereto through said passage, said bottom being formed with an outlet for said portion of said solids, provided with a displaceable cover.

2. The lock defined in claim 1 wherein said bottom is coupled to means for the recovery of energy generated by the movement of the said bottom.

3. A lock for the discharge of flowable solids from a pressurized container, comprising:

enclosure means forming a lock chamber below said container;

means forming a closable passage at a lower portion of said container communicating with an upper part of said lock chamber;

a displaceable bottom guided sealingly in said enclosure means and defining said lock chamber therein, the volume of said lock chamber being determined by the position of said displaceable bottom; and means for controlling the displacement of said bottom to relieve pressure in said lock chamber upon transfer of a portion of said solids thereto through said passage, said bottom being formed by an upwardly open receptacle in said enclosure.

4. The lock defined in claim 3 wherein said bottom is coupled to means for the recovery of energy generated by the movement of the said bottom.

* * * * *